(12) United States Patent
Parker

(10) Patent No.: US 8,213,023 B2
(45) Date of Patent: Jul. 3, 2012

(54) VELOMETER, NAVIGATIONAL APPARATUS AND METHODS FOR DIRECT MEASUREMENT OF OBJECT'S OWN VELOCITY

(76) Inventor: Val Parker, Pittsford, NY (US)

(\*) Notice: Subject to any disclaimer, the term of this patent is extended or adjusted under 35 U.S.C. 154(b) by 133 days.

(21) Appl. No.: 12/803,826

(22) Filed: Jul. 8, 2010

(65) Prior Publication Data

US 2012/0008149 A1    Jan. 12, 2012

(51) Int. Cl.
*G01B 11/14* (2006.01)
*G01P 3/36* (2006.01)

(52) U.S. Cl. .............................. 356/614; 356/27; 356/28

(58) Field of Classification Search .......... 356/601–640, 356/27, 28, 28.5, 4.01; 340/552, 541, 555, 340/556, 567, 933, 942; 250/222.1, 221, 250/561, 559.22

See application file for complete search history.

(56) References Cited

U.S. PATENT DOCUMENTS

| | | | | |
|---|---|---|---|---|
| 4,201,083 A * | 5/1980 | Kurita et al. | ............... | 73/861.06 |
| 4,773,029 A * | 9/1988 | Claesson et al. | ............ | 702/167 |
| 4,914,307 A * | 4/1990 | Kanev | ...................... | 250/559.12 |
| 4,949,972 A * | 8/1990 | Goodwin et al. | ............. | 273/371 |
| 5,392,034 A * | 2/1995 | Kuwagaki | ...................... | 340/933 |
| 5,479,008 A * | 12/1995 | Nishiyama et al. | ........ | 250/222.1 |
| 5,903,355 A * | 5/1999 | Schwarz | ......................... | 356/394 |
| 5,969,823 A * | 10/1999 | Wurz et al. | ..................... | 356/639 |
| 6,507,025 B1 * | 1/2003 | Verbinski et al. | .......... | 250/358.1 |
| 6,737,970 B2 * | 5/2004 | Wuestefeld et al. | .......... | 340/552 |
| 6,958,456 B1 * | 10/2005 | Jur et al. | ..................... | 200/50.01 |
| 7,187,457 B2 * | 3/2007 | Kobayashi | ..................... | 356/639 |
| 7,329,858 B2 * | 2/2008 | Okada | ...................... | 250/231.13 |
| 7,911,592 B2 * | 3/2011 | Chen et al. | ........................ | 356/28 |
| 2001/0052984 A1 * | 12/2001 | Ookubo | ........................ | 356/614 |
| 2002/0047633 A1 * | 4/2002 | Jurs et al. | ....................... | 315/291 |

\* cited by examiner

*Primary Examiner* — Sang Nguyen
(74) *Attorney, Agent, or Firm* — Robert J. Bird

(57) ABSTRACT

A beam of light or other electromagnetic field is emitted and received in a vacuum, all within an apparatus in motion. The nature of light permits the beam of light to retain the characteristics of its motion in vacuum, regardless of motion of the apparatus in which the emitted light propagates. The light beam retains its position in space relative to the direction of motion of the apparatus. Since both entities, light beam and apparatus, are disposed in the same frame of reference, characteristics of their motion can be compared. The result of this comparison represents the vector of velocity V of the apparatus which is utilized in navigation of the apparatus.

9 Claims, 3 Drawing Sheets

VELOMETER, NAVIGATIONAL APPARATUS AND METHODS FOR DIRECT MEASUREMENT OF OBJECT'S OWN VELOCITY

BACKGROUND OF THE INVENTION

1. The Field of the Present Invention

The present invention relates generally to the field of onboard navigational instrumentation. More specifically the present invention relates to an apparatus and methods for accurately establishing the vector of velocity of an object in motion from the information provided within and directly by the motion of the object itself and which is relative to initial spatial parameters of the object.

2. General Background

For the purposes of this application, the terms "electromagnetic media", "non-inertial media", "light", "beam of light", "pulse of light", "luminous flux" or equivalent terminology are meant to be synonymous unless otherwise stated. Likewise, the terms "instruments", "devices", "apparatus" or equivalent terminology are meant to be interchangeable unless otherwise stated. Similarly, the terms "body", "object", "inertial frame", or equivalent terminology are meant to be synonymous unless otherwise stated. References made in the English measurement system are hereafter assumed to include their metric equivalent values and vice versa.

Various-methods and apparatus are know for measuring the speed of objects in motion. They all function on the basis of one or the other of two well-established methods:
(1) measuring object speed by comparing its motion against other object (e.g., reading the speed of a car by measuring its motion relative to the Earth surface. (2) measuring object speed by integrating its measured acceleration (i.e., speed as the integral of acceleration).

These methods have limitations: the needs for continuous outside referencing, lack of accuracy and consistency, and most of all inability to vectorize motion i.e. provide simultaneous information on speed and direction of travel from direct onboard readings of an individual instrument.

Corpuscular-wave nature of light and its independence from inertial frames of references because of photon zero mass and zero electric charge are well known in classic and quantum electrodynamics. The zero-mass photon provides the basis for the navigational instrument of this invention.

Michelson and Gale in 1925 experimented to measure the speed of Earth rotation by means of counter-rotating light beams channeled within vacuum tubes disposed in a large rectangle planar array corresponding to East-West and North-South axes. Developments in optics and laser technologies in the 1970s allow for significant improvement of Michelson-Gale experiment and development of Canterbury Ring Laser which opened the way to development of whole new family of navigational instruments, functionality of which based on Ring Laser Gyro (RLG) effects. RLG brought great improvements to space navigation, but the main problems and shortcomings of the gyro based navigational technology continue to hinder abilities to successfully navigate in 2-dimensional 3-dimensional space.

Advances in photonics open the way for development of a new class of navigational devices called "Velometers". Velometer utilizes the measurements of displacement of inertial frame a body or an object in relation to independent and straight-line propagation of light in vacuum within the same inertial frame. The ability to measure displacement of an object in relation to independent straight-line propagation of light provides information on velocity i.e. speed and direction of travel of the object from within the object in motion itself. One caveat must be taken into account: there is no absolute rest in nature, the Velometer provides velocity measurements in relative terms i.e. measurements that null or discount the object's initial position and velocity in space.

SUMMARY OF THE INVENTION

The present invention include apparatus and methods to internally detect and measure the speed and the direction of travel a moving object by measuring displacement of the object relation to independent straight-line propagation of light in vacuum within the object itself.

Advantages of this invention include its ability to provide spatial 2 and 3 dimensional velocity of an object in space, simplicity of operation, quality and stability of the measurements, cost effective navigation, and stealth i.e. independence from external influence.

In a first aspect, this invention includes apparatus having an emitter and a receiver positioned in the same plane at fixed distance and facing each other, with light traveling in vacuum in-line with the vector of velocity. To prevent possible inconsistencies, there is vacuum within the apparatus. The emitter and said receiver are separated by a fixed distance, and due to the constant speed of light in vacuum, the distinctive characteristics (e.g. timing) of light arriving at the receiver correlates with the velocity of said apparatus. Now, placing the apparatus along two or three axes provide measurement of the velocity vector of the object in 2-dimensional or 3-dimensional space.

Some embodiment of this invention is similar to that described above but with light traveling transverse to the velocity of said apparatus. In addition, optical elements reflect and/or refract light are placed between said emitter and said receiver in such ways that due to motion of said apparatus light encounters such optical elements which alter the light's characteristics (e.g. phase, frequency, modulation, etc.) in accordance with the velocity of said apparatus.

In another embodiment, an emitter and receiver are positioned in vacuum, in the same plane, at fixed distance and facing each other, with means to reflect and/or refract light. A beam of light from the emitter travels transverse to the velocity of the object. Due to the object's motion along its emitter-receiver axis, the emitter moves away from its position and the receiver is brought into contact with the beam of light. Because the speed of light in vacuum is universally constant, and the distance between emitter and receiver is fixed, elapsed time for travel from emitter to receiver is a measure of the speed of the object.

In another embodiment, the emitter is placed at fixed distance above and facing the receiver which is an array of light detectors placed in-line or area-wide. Light emitted toward the receiver, due to the motion of the object along the plane of array of light detectors, energizes a specific detector, the place of which in the array is correlated with speed and direction of the object's movement.

In yet another embodiment, an emitter is positioned at some angle to and apart from the receiver. Between emitter and receiver is placed an optical wedge to divide and reflect light from the emitter. The wedge includes a front beam splitter to reflect light of specific characteristics, and a back full mirror to reflect all incoming light at specific angle relative to the front mirror. In this embodiment, a beam of light is emitted toward the wedge. At the front mirror of the wedge, one part of the beam (a reference beam) is reflected directly toward the receiver and the other part (an information beam)

is directed to the back mirror. From the back mirror, the information beam is reflected to the receiver. The angle between front and the back surfaces is such that after the second reflection the information beam joins the reference beam at the receiver. Since the wedge has different thickens at different points of the profile, the motion of the object that is in-line and along the emitter-wedge-receiver axis, places the emitted beam at different parts of the wedge hence changing correlation between characteristics of the beams. The detector measures that difference by which the velocity of the object is determined.

Thus, according to this invention, a velocity vector of an object in motion may be determined by the time of arrival of light at a receiver, or it may be determined by comparing specific characteristics (e.g. frequency, polarization, etc.) of light that composed of elements of the required characteristics.

THE DRAWINGS

DETAILED DESCRIPTION OF THE PREFERRED EMBODIMENTS

The invention will now be described more fully with reference to the accompanying Drawing.

Two principles provide the basis for the method and apparatus of this invention: (1) light travels in space or vacuum in a straight line, independent of any inertial system, and with a universally constant speed, and (2) the corpuscular-wave nature of light and its independence from inertial frames of reference because of zero mass and zero electric charge of the photon.

Figure 1:
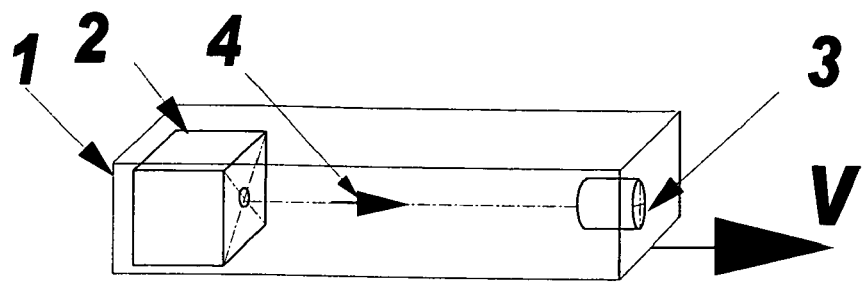
FIG. 1 is a fragmentary section diagram of an apparatus include an emitter and a receiver facing each other.

FIG. 1 shows an apparatus 1 include an emitter 2 and a receiver 3 which positioned in the same plane at fixed distance, across from, and facing each other. The apparatus 1 is moving at a velocity V emitted light 4 travels in-line with the velocity vector V of the apparatus. To prevent possible inconsistencies, the interior of the apparatus 1 is at. vacuum. Since the emitter 2 and receiver 3 are at a fixed distance from each other, the distinctive characteristic (timing) of light 4 arriving at the receiver 3 correlates with the velocity V of the apparatus 1.

Figure 2:
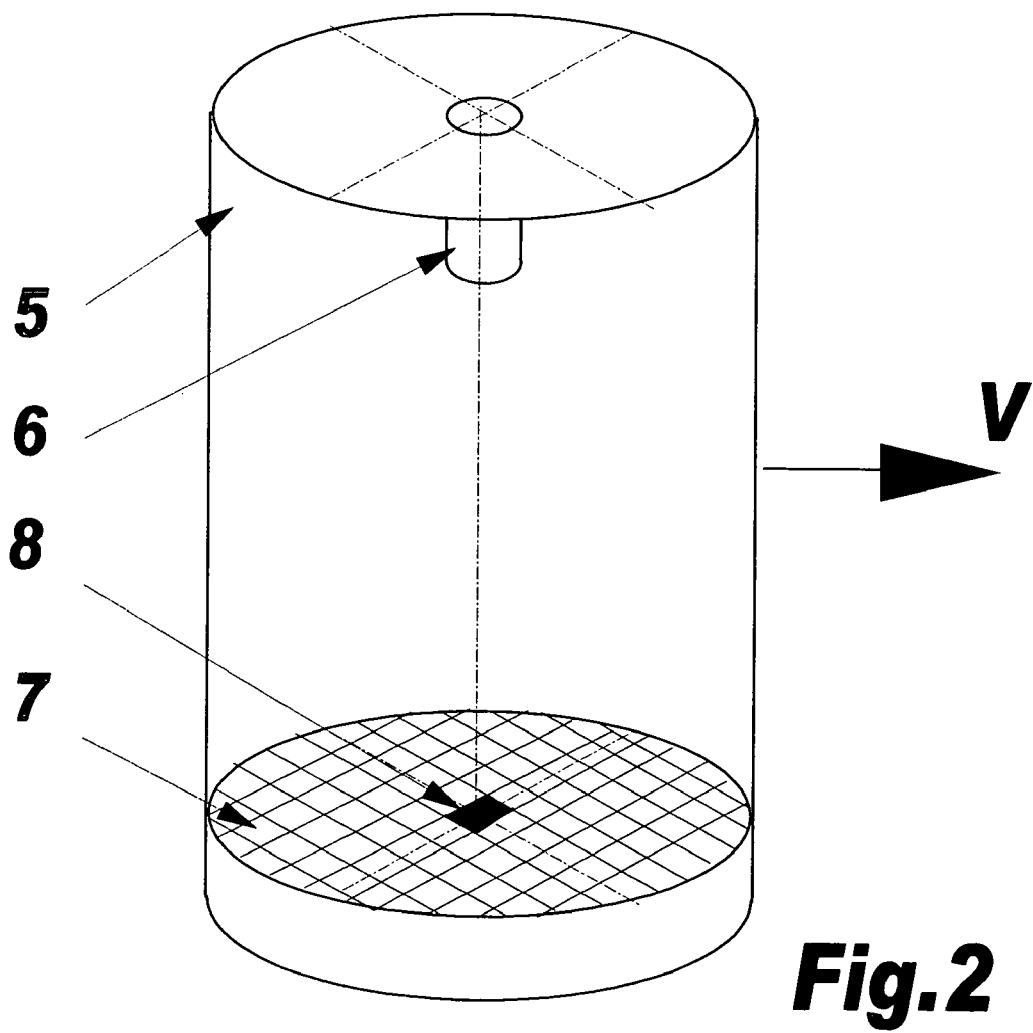
FIG. 2 is a diagram of similar with a receiver of numerous light detectors.

FIG. 2 an apparatus 5 having, at the bottom, a receiver including array of light detectors 7. Located a fixed vertical distance above the centered light detector 8 of the array 7 is a light emitter 6. The apparatus S is moving along the plane of the receiver with velocity V. The interior of the apparatus S is at vacuum. At specific intervals, pulses of light are emitted from the emitter 6 toward the array of light detectors 7. Light pulses move in a. straight line to the detector array 7, regardless of motion or velocity of apparatus 5, with at constant speed "c". When the tight pulse reaches the plane of receivers 7, they have moved from their initial position, hence, the light pulse strikes a specific light detector different from the centered light detector 8. The displacement or distance of the activated peripheral tight detector 7 relative to the central detector 8 is related to the velocity "V"of the apparatus S.

Figure 3:
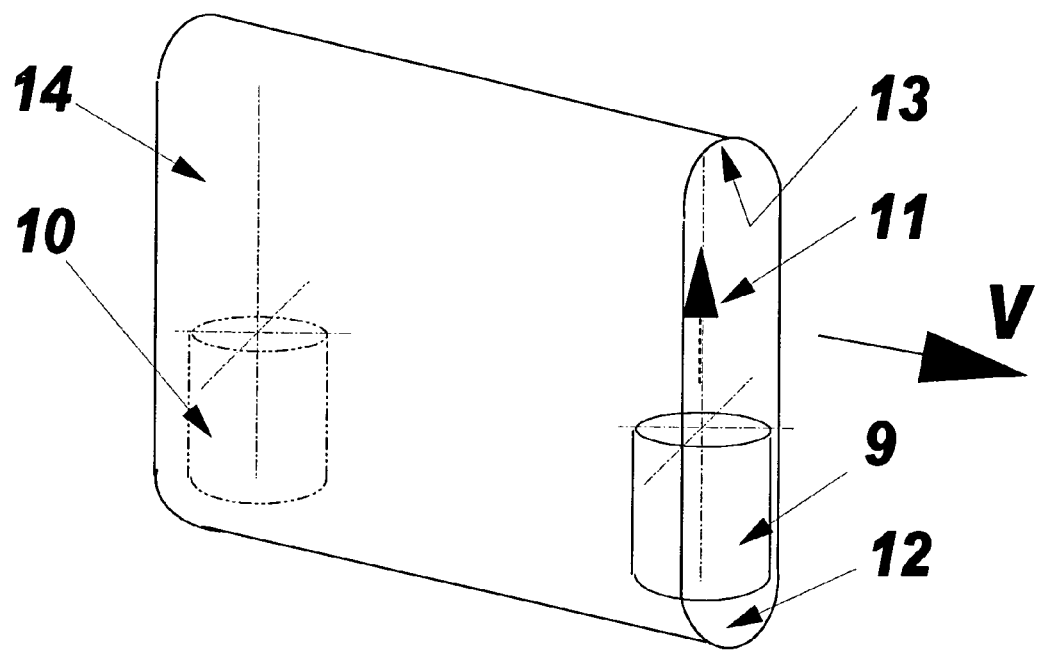
FIG. 3 is a diagram of apparatus in which emitter and a receiver are in same plane.

FIG. 3 shows an emitter 9 and receiver 10 positioned within an apparatus 14 on one side 12, and at a fixed distance from each other. The emitter/receiver side 12 and opposing side 13 are reflective and/or reflective of light. The inside of the apparatus 14 is at vacuum. A pulse of light 11 is emitted from emitter 9 toward the opposite side 13. Due to the transverse apparatus motion with velocity V relative to the emitter-receiver axis, the emitter 9 moves away from its position and the pulse of light 11 continuously travels between sides until the receiver 10, moving with apparatus 14 at velocity V moves into contact with the pulse of light 11. Since speed of light in vacuum is universally constant and the distance between emitter and receiver is a fixed dimension, the time elapsed between emission from emitter 9 and incidence at receiver 10 is proportional to the velocity of the apparatus 14.

Figure 4:
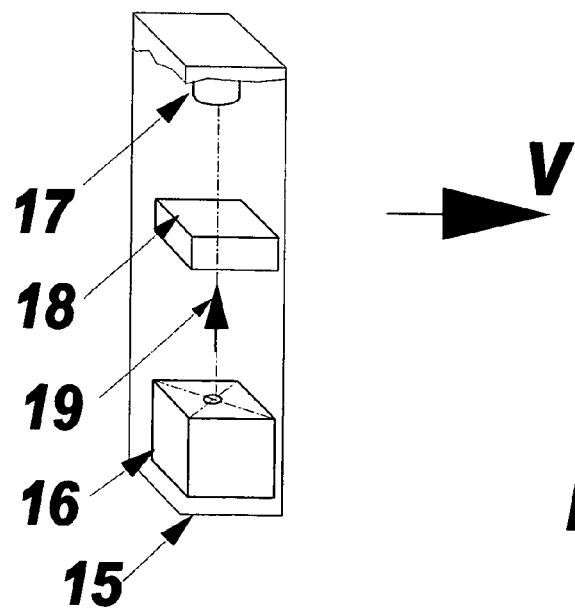
FIG. 4 is a diagram of an apparatus with emitter and a receiver in another form of my invention.

FIG. 4 shows an apparatus 15 including an emitter 16 and receiver 17 positioned in the same plane at fixed distance from each other, and facing each other. A reflector/refractor 18 is disposed in the optical axis between emitter 16 and receiver 17. The beam of light 19 emitted along the optical axis transverse to the motion velocity V of the apparatus 15. The reflector/refractor 18 has optical characteristics that vary with velocity V. The interior of apparatus 15 is at vacuum. The position of light and its interaction with the reflector/refractor 18 alter characteristics of light at the receiver 17 in accordance with the velocity of the apparatus 15.

Figure 5:
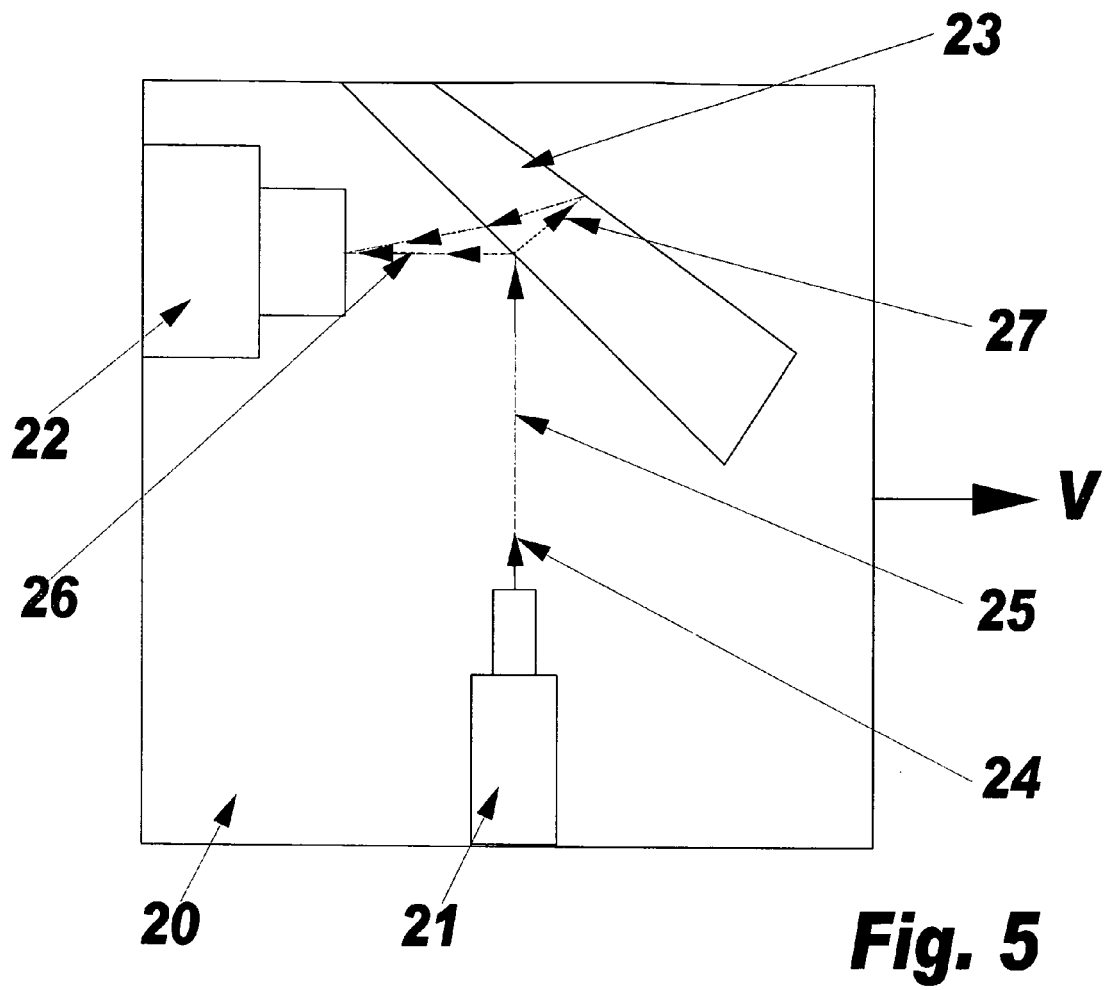
FIG. 5 is a diagram of apparatus according to another the embodiments of this invention.

FIG. 5 shows an apparatus 20 which includes and emitter 21, receiver 22, and wedge optics (e.g. prism 23) disposed in the optical axis between emitter 21 and receiver 22. The interior of apparatus 20 is at vacuum. Apparatus 20 is moving relative along the emitter/wedge/receiver plane with velocity V. A beam of light 24 is emitted along the path 25 toward the wedge optics 23. At the point of incidence with wedge optics 23, part of the beam 25 is reflected toward the receiver 22 as a "reference"beam 26. The other part of the beam 25 is refracted into the wedge optics 23 as an "information"beam 27. At the back surface of the wedge optics 23, the information beam 27 is further reflected back to the front of the wedge optics where it is refracted again. This last refraction puts the information beam 27 on its path to the receiver 22. The length of trajectory of the information beam 27 inside the wedge 23 changes arrival time and/or light characteristics between the information 2.7 and reference Z6 beams at the receiver 22. These measurable changes are proportional to the thickness of the wedge 23 and the internal trajectory of the beam 27.

Figure 6:
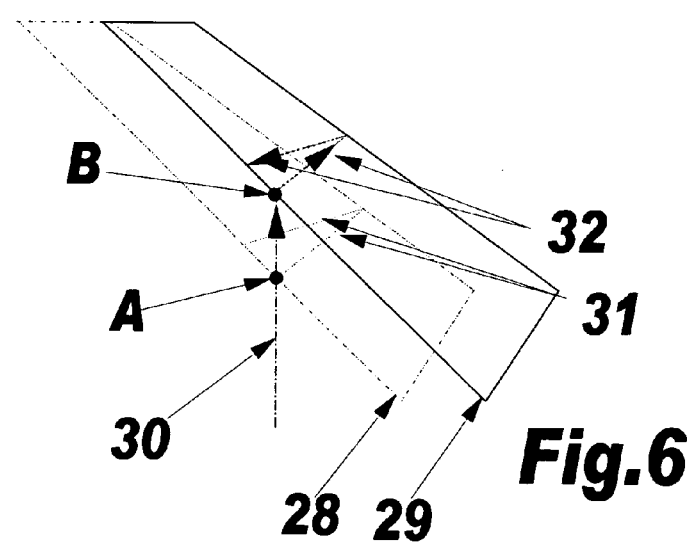
FIG. 6 is a diagram of a detail from FIG. 5

Referring now to FIG. 6, we will describe the process on which our apparatus (20) is built. The optical wedge (28) shown in phantom line denoted position of the apparatus (20) when said apparatus is in stationary position (V=0). In that position, the beam of light (30) is emitted toward the wedge (28). At the point "A" the beam of light (30) intersect front of the wedge, where one part of the beam of light is reflected toward the receiver and the other part is refracted inside of the wedge (28). At the back surface of the wedge (28) the refracted beam further reflected back toward the front of the wedge (28) creating trajectory (31). The length of the trajectory (31) is proportionally changes arrival time and/or light characteristics between the reflected or reference beam and the refracted or information beam at the receiver.

The apparatus 20 is moved, with velocity V, in the emitter-wedge-receiver plane. When the apparatus 20 was stationary, the light beam 30 was emitted toward the wedge. When the light beam 30 reaches the wedge, the last, as a part of the apparatus in motion under velocity V, moves into position denoted on FIG. 6 by the wedge optics 29.

At Point B, the light beam 30 strikes the front of the wedge optics 29. At that point, similarly as described above, one part of the light beam is reflected toward the receiver and the other part is refracted with the wedge 29. In this case the trajectory 32 of the light path within the wedge 29 is longer than the trajectory 31, hence arrival time and/or light characteristics between the reflected and refracted beams at the receiver is different from the characteristics created by the trajectory 31. Having constancy of physical dimensions inside of the apparatus and universal constancy of the speed of light in vacuum ($c=3\times10^8$ m/sec), the difference between the trajectories 3t and 32 is proportional to the velocity of the apparatus 20.

In the following claims, any terms indicative of orientation (e.g. front, back; left, right; top, bottom; horizontal, vertical) are meant only to correspond with the illustrations to facilitate an understanding of the claimed invention. Such terms are not intended as positive limitations.

The foregoing description of preferred embodiments is illustrative. The concept and scope of the invention are limited not by such details but only by the following claims.

The invention claimed is:

1. A system to detect and measure, from within an unitary apparatus, the velocity V of movement of said apparatus relative to a reference line within but independent of said apparatus by measurement of displacement of said apparatus relative to said reference line, said system including:
    an electromagnetic emitter disposed on an optical axis to emit electromagnetic energy along said optical axis; and
    an electromagnetic receiver disposed on said optical axis, at a fixed distance from said emitter and facing said emitter, to receive electromagnetic energy therefrom;
    wherein said reference line being a straight-line propagation of electromagnetic energy from said emitter to said receiver through vacuum within said apparatus, wherein said velocity V is measured as a function of elapsed time of travel of said electromagnetic energy from said emitter to said receiver.

2. A system as defined of claim 1, wherein said reference line is in the direction of travel of said apparatus.

3. A system as defined of claim 1, wherein said reference line is transverse of the direction of travel of said apparatus.

4. A system as defined in claim 1, wherein said velocity V is measured as a function of characteristics of said electromagnetic energy at said receiver.

5. A system to detect and measure, from within an unitary apparatus, the velocity V of movement of said apparatus relative to a straight-line reference light beam within but independent of said apparatus by measurement of displacement of said apparatus relative to said reference light beam, said system including:
    a light emitter disposed on an optical axis to emit said reference light beam along said optical axis;
    a receiver including a planar array of light detectors at a fixed distance from said emitter and facing said emitter to receive said reference light beam, said detectors spaced from each other in a plane parallel to the direction of travel of said apparatus;
    a central one of said detectors of said array being centered in said optical axis; and
    said reference light beam propagating from said emitter to said receiver through vacuum within said apparatus;
    wherein said reference light beam is detected by a receiver detector in said array, the separation of said receiver detector from said central detector being indicative of said velocity V, and wherein detection of light by a detector other than said central detector is indicative of movement of said apparatus, and the separation of said detector other than said central detector from said central detector is indicative of said velocity V of said movement.

6. A system to detect and measure, from within an unitary apparatus, the velocity V of movement of said apparatus relative to a reference light beam within but independent of said apparatus by measurement of displacement of said apparatus relative to said reference light beam, said system including:
    a light emitter and a light receiver in said apparatus at a fixed distance from each other along an optical axis transverse to the direction of movement of said apparatus;
    said optical axis extending from said emitter, via plural reflections/refractions, to said receiver so that a light beam from said emitter travels up and down, transverse to said movement of said apparatus, to said receiver; and
    said reference light beam propagating from said emitter to said receiver through vacuum within said apparatus;
    whereby the elapsed time from emission to reception of said light beam is a measure of said velocity of said apparatus, and wherein said velocity V is determined as a function of changes of characteristics of said light in response to said velocity.

7. A system as defined in claim 6, wherein said velocity V is determined as a function of changes of characteristics of said light in response to said velocity.

8. A system to detect and measure, from within an unitary apparatus, the velocity V of movement of said apparatus relative to a reference light beam within but independent of said apparatus by measurement of displacement of said apparatus relative to said reference light beam, said system including:
    a light emitter disposed on an optical axis to emit said reference light beam along said optical axis;
    a receiver disposed on said optical axis at a fixed distance from said emitter to receive said reference light beam;
    said reference light beam propagating from said emitter to said receiver through vacuum within said apparatus; and
    wedge optics disposed on said optical axis between said emitter and said receiver to fold said optical axis and to redirect light from said emitter to said receiver, said wedge optics including a front beam divider surface to reflect a reference portion of said reference light beam to said receiver, and a back internally-reflective surface to reflect an information portion of said reference light beam to said receiver, said wedge optics thereby delaying and modulating said information portion relative to said reference portion;
    wherein the plane defined by said folded optical axis is normal to the direction of said movement of said apparatus, and wherein velocity V of said object is determined as a function of elapsed time of travel of said information portion between said emitter and said receiver, relative to elapsed time of travel of said reference portion between said emitter and said receiver.

9. A system as defined in claim 8, wherein velocity V of said object is determined as a function of modulations of said information portion relative to said reference portion of said reference light beam.

* * * * *